June 13, 1939.    L. P. HACKER    2,162,080
SNATCH BLOCK
Filed June 22, 1937

Inventor
LOUIS P. HACKER.
Jesse R. Stone
Lester B. Clark
By
Attorneys.

Patented June 13, 1939

2,162,080

UNITED STATES PATENT OFFICE 2,162,080

SNATCH BLOCK

Louis P. Hacker, Overton, Tex.

Application June 22, 1937, Serial No. 149,615

1 Claim. (Cl. 254—193)

The invention relates to a snatch block of the type wherein one side of the block may be released for the insertion and removal of the flexible member such as the cable or rope.

It is one of the objects of the invention to provide a snatch block wherein the supporting hook will serve to lock the side plate in position when the hook is in supporting position and to release the side plate when the hook is in non-supporting position.

Another object of the invention is to provide a locking mechanism for snatch block plates whereby an eccentric lug arrangement will be moved into locking position to hold the plate when the snatch block is in operative position.

Other and further objects of the invention will be readily apparent when the following description is considered in connection with the accompanying drawing wherein.

Figures 2, 3:
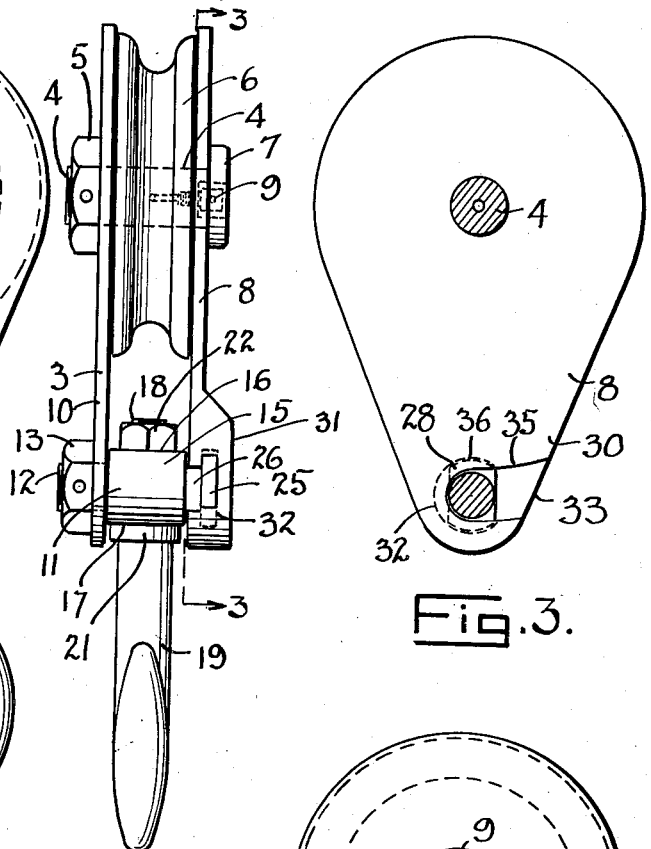
Fig. 2 is an edge view looking at the lefthand edge of Fig. 1.
Fig. 3 is a section taken on the line 3—3 of Fig. 2 and looking in the direction of the arrows.

The snatch block is indicated generally at 2 and as seen in Fig. 2 is composed of a side plate 3. This plate is arranged to support the shaft 4 which is fixed in position in an opening through the plate by means of the nut 5. This shaft 4 extends laterally from the plate and is arranged to support the sheave 6 rotatably thereon. A head 7 on the shaft engages the opposite side plate 8 and this plate is pivotally mounted upon the shaft so that it may be rotated relative to the other side plate 3. A lubricating device 9 may be arranged on the end of the shaft so that lubricant may be passed into the shaft to permit ready turning of the sheave 6.

Figure 1:
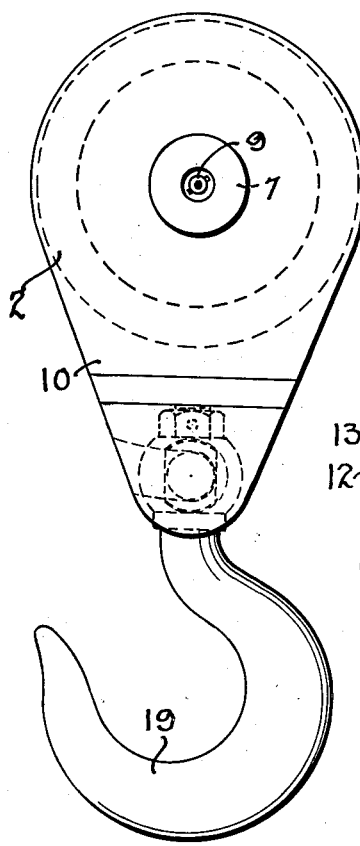
Fig. 1 is a side elevation of the snatch block in operative position.

As seen in Fig. 1, the plate 3 has an extension 10 thereon, which is arranged to rotatably support the pin 11. This pin has a reduced threaded end 12 which receives the nut 13 to hold it rotatably in the extension 10 of the plate 3. This pin has an enlarged cylindrical body portion 15, which is formed with flat opposite faces 16 and 17. There is a transverse opening through this body 15 which is arranged to receive the shank 18 of the hook 19. A flange 21 on the hook abuts against the face 17 and the nut 22 abuts the face 16. In this manner the hook 19 is attached to the pin but is rotatable about an axis transversely of the pin, the pin itself being rotatable about its own axis in the plate 3.

Figure 4:
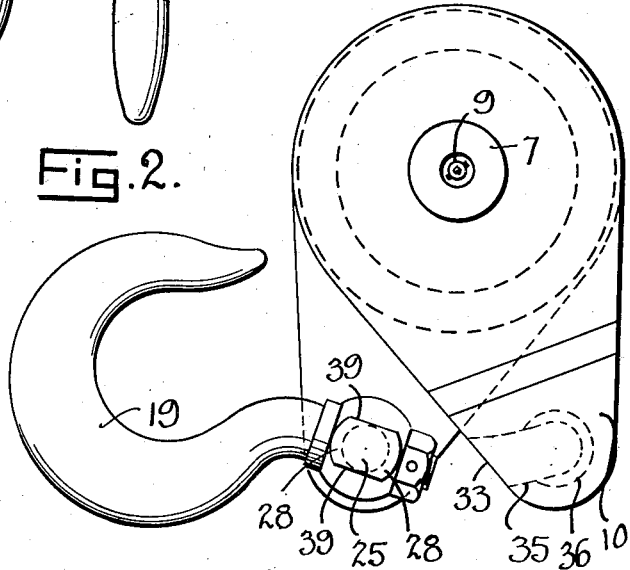
Fig. 4 is a view showing the supporting hook moved to inoperative position so that the side plate may be released therefrom.

Beyond the body 15 the pin is provided with an enlarged head 25, which is spaced from the body 15 by the reduced neck 26. The head 25 is of substantially elliptical construction as best seen in Fig. 4, and is provided with the end extensions 28 which project beyond the neck portion 26. The major or longitudinal axis of this elliptical head is transversely of the pin 11.

The plate 8 is of peculiar construction, as seen in Figs. 3 and 4, in that the extension 30 thereof is thickened, as at 31, in order to provide sufficient material to be cut away in forming the recess 32. This recess is formed transversely of the extension 30 and extends laterally therein from the side 33 of the plate. A neck portion 35 of the recess is enlarged at 36 to provide sufficient area so that the end portions 28 of the head 25 can be turned into a cross position so that the head can not thereafter move outwardly through the neck portion 35.

In operation, as seen in Fig. 4, the hook 19 will be turned through a quarter of a turn to the lateral position, so that the flat faces 39 on each side of the head 25 will enable the head to pass through the neck portion 35 of the recess 32. This position allows the plate 8 to be swung away from the pin, as seen in Fig. 4. With the plate in this position the cable or rope may be passed in over the sheave 6.

The plate 8 may now be swung backwardly into alignment with the plate 3 and when the hook is turned backwardly through a quarter of a turn the lugs 28 move into the enlarged portion 36 of the recess and the plate 8 can not thereafter be turned so long as the hook is in operative or supporting position.

It will be seen from the foregoing description that the snatch block is provided with a positive locking member due to the extensions 28 on the locking head so that a safety block will be provided which can not become unlatched so long as the supporting hook is in load-carrying position.

What is claimed is:

A snatch block of the character described comprising a side plate, a shaft carried thereby, a sheave rotatably mounted on said shaft, a support pin passing thru said plate adjacent one side thereof, said pin including an enlarged central body, flat edge faces on said body, an opening transversely of said body, a support hook having a shank passing thru said opening and rotatable therein, means holding one end of said pin rotatably in said plate, a head on the other end of said pin, a neck of reduced diameter spacing said head from said body, said head being elongated transversely of the pin with flat side faces so that it is substantially elliptical, another side plate pivoted on said shaft, one side thereon extending beyond said sheave and adjacent said pin, said end being thickened, an arcuate recess transversely on the inner face of said thickened plate, such recess being enlarged internally at the inner end thereof so that said head may be passed into the recess and locked therein upon rotation thru a quarter turn by the restricted entrance so that the elongated portion thereof will be turned into the enlarged portion of such recess and said plate will be locked in position when said hook is supporting the block and releasable when the hook is turned down to either side.

LOUIS P. HACKER.